(12) United States Patent
Sood et al.

(10) Patent No.: US 12,185,200 B2
(45) Date of Patent: Dec. 31, 2024

(54) SYSTEM FOR DETECTION OF ABANDONMENT OF A USER DEVICE

(71) Applicant: ZEBRA TECHNOLOGIES CORPORATION, Lincolnshire, IL (US)

(72) Inventors: Ajay Sood, Bangalore (IN); Rajarshi Chatterjee, Palatine, IL (US); Manish K. Singh, Bangalore (IN); Amrit Goyal, Bangalore (IN)

(73) Assignee: Zebra Technologies Corporation, Lincolnshire, IL (US)

(*) Notice: Subject to any disclaimer, the term of this patent is extended or adjusted under 35 U.S.C. 154(b) by 302 days.

(21) Appl. No.: 17/683,164

(22) Filed: Feb. 28, 2022

(65) Prior Publication Data

US 2023/0276207 A1 Aug. 31, 2023

(51) Int. Cl.
*H04W 4/20* (2018.01)
*H04W 4/029* (2018.01)

(52) U.S. Cl.
CPC ............. *H04W 4/20* (2013.01); *H04W 4/029* (2018.02)

(58) Field of Classification Search
CPC .......... G06F 21/88; H04W 4/029; H04W 4/20
USPC ...................................................... 455/67.11
See application file for complete search history.

(56) References Cited

U.S. PATENT DOCUMENTS

| | | | | |
|---|---|---|---|---|
| 10,542,143 | B2* | 1/2020 | Segalis | G06Q 10/10 |
| 2012/0208562 | A1* | 8/2012 | Wilkin | H04L 43/091 |
| | | | | 455/456.3 |
| 2013/0257604 | A1 | 10/2013 | Mirle et al. | |
| 2014/0200929 | A1 | 7/2014 | Fitzgerald et al. | |
| 2014/0280472 | A1* | 9/2014 | Riviello | H04L 67/535 |
| | | | | 709/203 |
| 2015/0087258 | A1* | 3/2015 | Barnes | H04W 4/90 |
| | | | | 455/404.2 |
| 2015/0262217 | A1* | 9/2015 | Hoyne | G06Q 30/0242 |
| | | | | 705/14.41 |
| 2016/0066189 | A1* | 3/2016 | Mahaffey | H04W 12/12 |
| | | | | 455/405 |
| 2018/0091326 | A1* | 3/2018 | McLaughlin | H04L 41/0893 |
| 2018/0276974 | A1 | 9/2018 | Talty et al. | |
| 2020/0252754 | A1 | 8/2020 | Klinkner et al. | |
| 2020/0288306 | A1* | 9/2020 | Do | H04W 12/37 |
| 2021/0125612 | A1* | 4/2021 | Coman | G06N 5/025 |

(Continued)

OTHER PUBLICATIONS

International Search Report and Written Opinion for International Application No. PCT/US2023/13974 mailed on Jun. 7, 2023.

*Primary Examiner* — Tan H Trinh (57) ABSTRACT

In some implementations, a server device may receive event-based data associated with a user device, wherein the user device is communicatively coupled with the server device via an access point within a physical environment. The server device may determine, using a model, a status of the user device that is based on the event-based data, wherein the model is configured based on historical event data associated with historical events involving a plurality of other user devices that are associated with the user device. The server device may determine, based on the status indicating that the user device has likely been abandoned within the physical environment, a location associated with the user device. The server device may perform an action associated with the user device and the location.

20 Claims, 6 Drawing Sheets

(56) References Cited

U.S. PATENT DOCUMENTS

| | | | |
|---|---|---|---|
| 2022/0067816 A1* | 3/2022 | Miyassi | G06Q 30/02 |
| 2023/0247428 A1* | 8/2023 | Mahaffey | H04W 4/025 |
| | | | 455/411 |

* cited by examiner

SYSTEM FOR DETECTION OF ABANDONMENT OF A USER DEVICE

TECHNICAL FIELD

The present disclosure relates generally to detecting the status of a user device and, for example, to detect when a user device may be abandoned or otherwise lost.

BACKGROUND

User devices, such as wireless communication devices, mobile phones, environmental sensor devices, wearable devices, handheld scanning devices, and/or the like, are increasingly being used for a variety of purposes. Many user devices are easily lost, stolen, misplaced, or otherwise abandoned, especially user devices that are, for example, mobile, relatively small in size, and/or possessed by forgetful users. Lost user devices may negatively impact users and/or organizations in a variety of ways, including lost resources to recover and/or replace lost user devices, lost productivity due to the user devices being unavailable for productive uses when lost, and/or the like. To ensure devices are not abandoned, there is a need to detect when user devices are at risk of being lost or already lost, and a need to facilitate recovery of lost user devices.

SUMMARY

Some implementations described herein relate to a method. The method may include receiving, by a server device, event-based data associated with a user device, where the user device is communicatively coupled with the server device via an access point within a physical environment. The method may include determining, by the server device and using a model, a status of the user device that is based on the event-based data, where the model is configured based on historical event data associated with historical events involving a plurality of other user devices that are associated with the user device. The method may include determining, by the server device and based on the status indicating that the user device has likely been abandoned within the physical environment, a location associated with the user device. The method may include performing, by the server device, an action associated with the user device and the location.

Some implementations described herein relate to a system. The system may include one or more memories and one or more processors coupled to the one or more memories. The system may be configured to receive, via an access point, event-based data associated with a user device. The system may be configured to determine, using a model and based on one or more event parameters associated with the event-based data, a status of the user device. The system may be configured to determine, based on the status, that the user device has likely been abandoned within the physical environment. The system may be configured to perform an action associated with locating the user device.

Some implementations described herein relate to a tangible machine-readable medium that stores a set of instructions for a system. The set of instructions, when executed by one or more processors of the system, may cause the system to receive event-based data associated with a user device in a physical environment. The set of instructions, when executed by one or more processors of the system, may cause the system to monitor, using a model, a status of the user device that is based on one or more events identified in the event-based data. The set of instructions, when executed by one or more processors of the system, may cause the system to provide, to a management device, an indication of the status to permit the management device to monitor the user device for abandonment.

DETAILED DESCRIPTION

The following detailed description of example implementations refers to the accompanying drawings. The same reference numbers in different drawings may identify the same or similar elements.

Different people and different organizations may use a variety of user devices in a variety of ways. Whether for personal or business use, user devices are prone to being lost, stolen, misplaced, or otherwise abandoned. As used herein, "abandoned," may refer to all types of loss, intentional or otherwise. Many user devices are mobile and capable of operating in any location, which may make finding an abandoned user device difficult. In addition, many user devices are relatively small in size, which may also make recovering abandoned user devices difficult. Lost user devices may negatively impact users and/or organizations in a variety of ways, including lost resources to recover and/or replace lost user devices, lost productivity due to the user devices being unavailable for productive uses when lost, and/or the like. To ensure devices are not abandoned, there is a need to detect when user devices are at risk of being lost or already lost, and a need to facilitate recovery of lost user devices.

Some implementations described herein facilitate preventing user devices from becoming abandoned and also assist in the recovery of abandoned user devices, or user devices that are likely to be abandoned. For example, event-based data, including activity-based data, from user devices may be collected to determine patterns of use and/or non-use for various activities and over various periods of time. Using the collected data, a model may be generated to enable tracking monitored user devices to determine when the user devices are likely to be, or have been, abandoned. In a situation where a user device is likely to be abandoned, various actions may be taken to facilitate recovery of the user device, including alerts transmitted directly to the user device and other instructions transmitted to other devices that may be capable of facilitating recovery of the user device. As a result, user devices may be less likely to be abandoned, may be more likely to be recovered, and may be more likely to be recovered faster than traditional recovery methods. By reducing user device abandonment, negative impacts may be reduced for users and organizations that make use of user devices, which may include reducing resources that might otherwise be lost recovering and/or replacing abandoned user devices, improving productivity of both users and user devices due to user devices being available for use as opposed to being abandoned, and/or the like.

Figure 1:
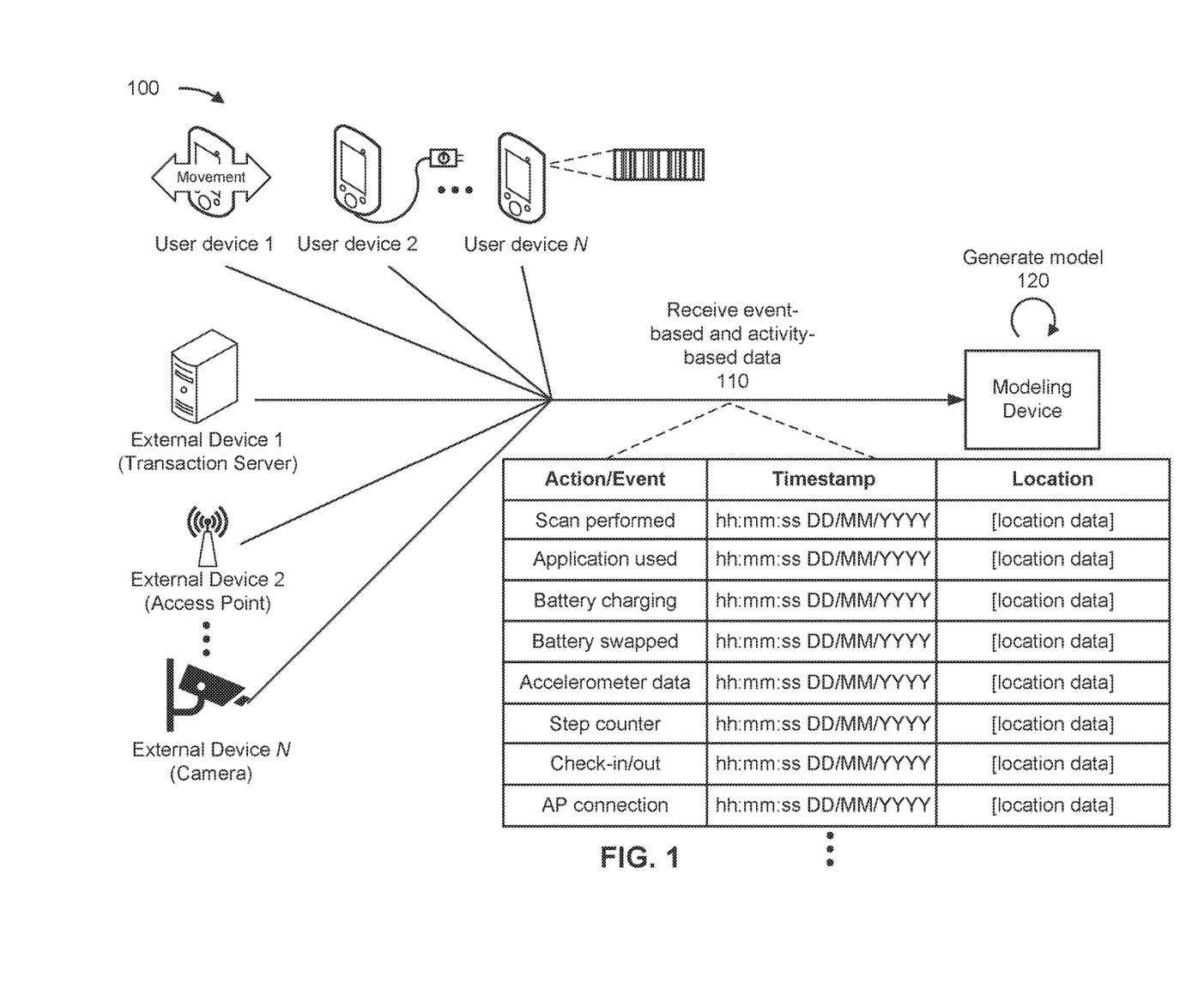
FIG. 1 is a diagram of an example implementation associated with detecting abandonment of a user device, as described herein.

FIG. 1 is a diagram of an example implementation 100 associated with detecting abandonment of a user device. As shown in FIG. 1, example implementation 100 includes user devices, external devices, and a modeling device. These devices are described in more detail below in connection with FIG. 4 and FIG. 5.

As shown by reference number 110, a modeling device may receive a variety of information regarding the usage of various user devices (e.g., user devices 1 through N). The information may be received from the user devices and/or from external devices (e.g., devices separate from the user devices and/or the modeling device). The information, referred to collectively herein as "event-based data," includes event-based and activity-based data associated with the user devices. A wide variety of event-based data may be provided to the modeling device to facilitate the generation of a model for use in determining whether a particular user device is likely to be abandoned and/or facilitate recovery of the particular user device, as described further herein.

In some implementations, event-based data received from the user devices may include data identifying an event, a timestamp associated with the event, and/or a location associated with the event, among other examples. Example events associated with a user device may include: events associated with a scan performed using the user device (e.g., a barcode scan event, quick response (QR) code scan event, radio frequency identifier (RFID) scan event, and/or the like), events associated with using an application of the user device (e.g., launching and/or interacting with a predetermined application, using a predetermined function of the application, and/or the like), events associated with charging a battery of the user device (e.g., connecting to a power source, disconnecting from the power source, reaching a full charge, reaching a predetermined threshold battery power, and/or the like), events associated with swapping a battery of the user device (e.g., disconnecting a battery, connecting a battery, and/or the like), events associated with accelerometer data of the user device (e.g., movement detected, no movement detected, a particular type and/or pattern of movement detected, a threshold type and/or pattern of movement satisfied, and/or the like), and/or events associated with a step counter of the user device (e.g., steps detected, steps not detected for a threshold period of time, number of steps within a predetermined time period, and/or the like), among other examples.

In addition to, or alternatively to, the events-based data being provided by the user devices, external devices may also provide events-based data to the modeling device. External devices, described further herein, are devices that interact with the user devices in some way. For example, a transaction server device may be a device that user devices communicate with when the user devices are used to perform a transaction (e.g., a purchase, an agreement, or other type of transaction). Other external devices may include, for example, access points (APs) that the user devices may use to access an internal and/or external network (e.g., a Wi-Fi access point, cellular access point, switch device, and/or the like), camera devices that might capture images and/or video of the user devices (e.g., security cameras, cameras attached to other devices, and/or the like), a workforce management device that tracks the user devices (e.g., via check-in and check-out procedures), a geo-fencing device that tracks the location of user devices (e.g., a geo-fencing server, geo-fencing beacon, and/or the like), and/or a smart cabinet for storing and/or charging user devices (e.g., a container or rack that tracks user devices via RFID, charges user devices, and/or the like), among other examples.

In some implementations, event-based data received from the external devices may include, by way of example: events associated with user device check-in and/or check-out (e.g., a time associated with user device check-in and/or check-out, a threshold period of time associated with a user device being checked in or out, and/or the like), events associated with an access point connection with the user device (e.g., a connection to an access point, a disconnection from an access point, a signal strength or other measurement associated with a quality of connection with the access point, and/or the like), events associated with geo-fencing (e.g., a user device entering/leaving a predefined location or area, a predetermined period of time the user device is in a particular area, and/or the like), events associated with transactions (e.g., a user device being used to perform at least a portion of a transaction), events associated with a smart storage device (e.g., a user device being added and/or removed from the smart storage device, charging of the user device by the smart storage device being initiated or ended, a predetermined period of time associated with charging and/or storing of the user device in association with the smart storage device, and/or the like), and/or events associated with a camera device (e.g., a tracking system, via the camera device, detecting a user device enter and/or leave a particular location, other activity detected at a location associated with the user device, and/or the like).

While some event-based data is described as being provided by user devices, and other event-based data is described as being provided by external devices, the foregoing are examples. In some aspects, any event-based data described herein may be provided by a user device and/or an external device.

Whether communicated by an external device or a user device, the event-based data may be communicated in a variety of ways. For example, the event-based data may be communicated via wired and/or wireless communication. In some aspects, the external devices and/or user devices may communicate the event-based data in near real-time (e.g., communicating based on detecting the event), periodically (e.g., based on a schedule), manually based on user input, and/or based on a triggering event (e.g., when the user device is checked in, when a particular application on the user device is used), and/or the like. In some implementations, the event-based data may be communicated one event at a time, and/or in batches, and may depend on the type of communication and/or the device transmitting the event-based data.

As shown by reference number 120, the modeling device may generate a model. For example, the modeling device may use the event-based data received from the user devices and/or the external devices to generate a model that is capable of being used to determine whether a user device is likely to be abandoned. In some implementations, the model may receive, as input, event-based data, such as any of the information associated with the events-based data described here (e.g., information identifying an event associated with a user device, a timestamp associated with the event, a location associated with the event, and/or the like). The model may provide, as output, an indication regarding whether the event-based data, provided as input, indicates that the user device is likely to be abandoned.

In some implementations, event-based data may be associated with historical event parameters that may be used to generate the model, including in use as training data for a machine learning model, as described herein. The historical event parameters may include, for example: a user interaction metric associated with other user devices (e.g., indicating times associated with events occurring at the other user devices), an application metric associated with an application installed on the plurality of other user devices (e.g., indicating usage of the application by the other user devices), location information that identifies locations of the plurality of other user devices during the historical events, a power consumption metric associated with batteries of the plurality of other user devices (e.g., including charging status of the other user devices), and/or a replacement interval associated with replacing the batteries of the plurality of other user devices, among other examples, as described herein in association with the different types of event data.

In some implementations, the model is generated manually (e.g., via user input and selection of which portions of event data, and which corresponding events, may lead to a determination that a user device is likely to be abandoned). In some aspects, the model may be machine generated. For example, as described in more detail herein (e.g., in connection with FIG. 3), the modeling device may use one or more machine learning methods to generate the model.

In some implementations, the modeling device may generate different models for different types of user devices and/or for different locations. For example, some user devices have different functionality, and different events may affect the likelihood of abandonment differently for different types of user devices (e.g., a user device that does not have a scanning feature may not need a model that takes the time since the last scan into consideration, or a larger user device may be less likely to be abandoned than a smaller device with the same event-based data). Different locations may use different models in a situation where the locations are associated with different levels of risk. For example, a location where user devices are more often abandoned (e.g., based on historical data for the location, a size of the location, specific features of the location, and/or the like) may use a model that is more likely to identify a user device as being abandoned than another model associated with a location associated with a lower level of risk. While different models may be used for different situations, in some implementations, the distinctions (e.g., in type of user device, location risk, and/or the like) may be features for a single model, rather than used to generate separate models.

In some aspects, a model may be generated based on a pattern of activity. For example, some events, given occurrence in a particular sequence or pattern, may be more likely to indicate abandonment in the particular sequence or pattern. For example, an expected pattern of activity for a remote user device used to scan objects in a warehouse or retail location, may be as follows: device is checked out from a smart storage area, disconnected from a charger, scans periodically throughout the day, returns to the smart storage area, and is connected to a charger (e.g., at the end of the day). In a situation where a user device has an expected pattern of activity, a deviation from this pattern may indicate the user device was abandoned. For example, in a situation where, after being disconnected from the charger, the user device does not scan anything for a first threshold period of time, the user device may be considered abandoned. As another example, if the user device is not returned to the smart storage area within a second threshold period of time, the user device may be considered abandoned. As described herein, the thresholds may be part of the model, and they may be manually derived and/or machine generated (e.g., via machine learning).

In some implementations, a model may define one or more thresholds, satisfaction of which provides an indication regarding whether a user device is likely to be abandoned. For example, a model may provide one or more thresholds to which one or more values (e.g., values associated with the aforementioned events and/or the features described elsewhere herein) are compared. A time since an accelerometer input was last provided by a user device, for example, may be compared to a threshold period of time, and if the threshold is met, the user device may be given a value associated with a likelihood of abandonment associated with that threshold. In some implementations, the model may have multiple thresholds associated with a single value (e.g., multiple time thresholds associated with the last accelerometer input) with different values for likelihood of abandonment associated with each. In some implementations, combinations of thresholds may be used, instead of or in addition to single thresholds, to indicate a likelihood of abandonment. In some implementations, thresholds associated with the model may be based on empirical evidence, user input, machine learning, or a combination thereof.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
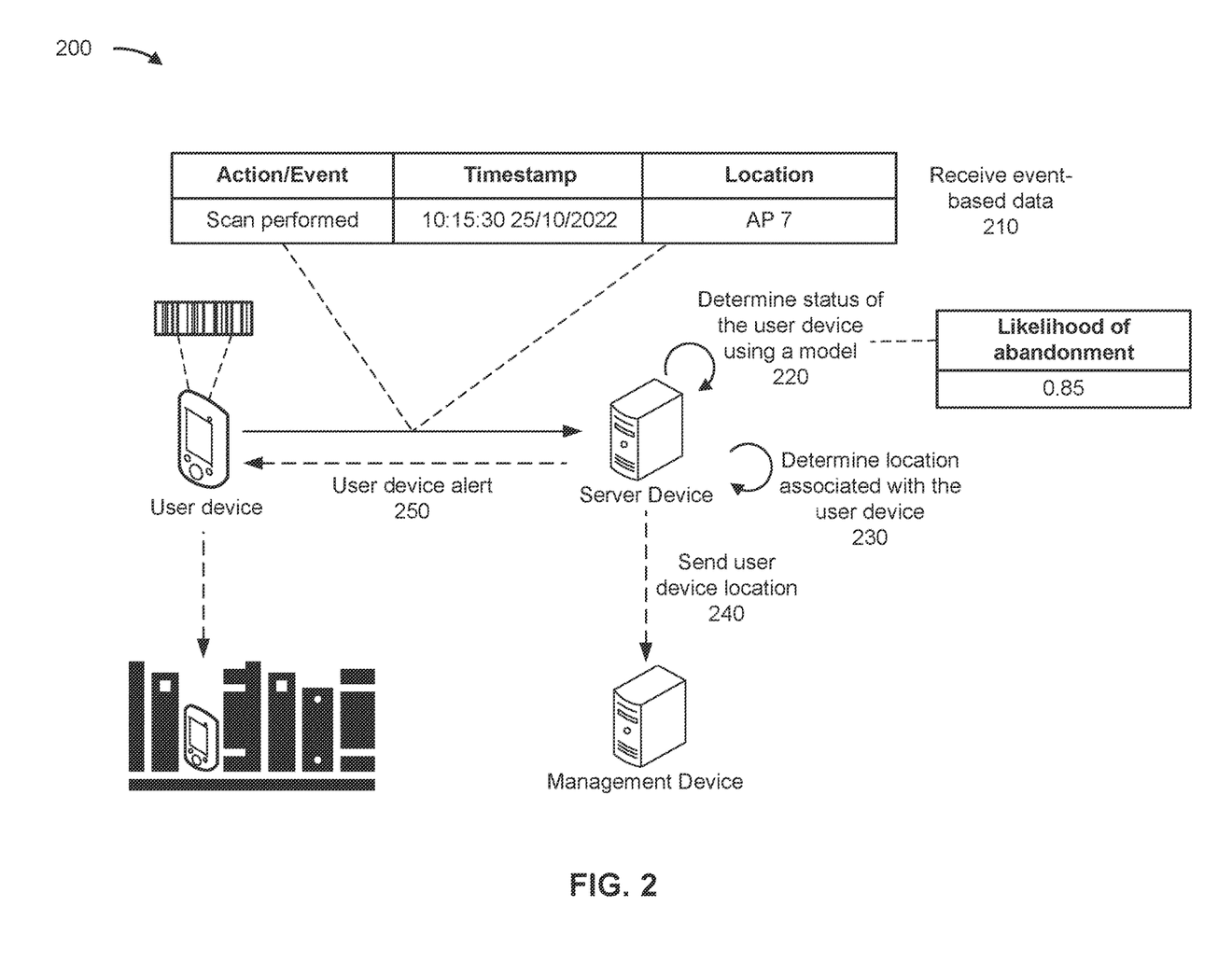
FIG. 2 is a diagram of another example implementation associated with detecting abandonment of a user device, as described herein.

FIG. 2 is a diagram of another example implementation 200 associated with detecting abandonment of a user device. As shown in FIG. 2, example implementation 200 includes a user device, a server device, and a management device. These devices are described in more detail below in connection with FIG. 4 and FIG. 5.

As shown in example implementation 200, a server device may be used to detect whether a user device is likely to be abandoned and take one or more actions designed to recover the user device, as described herein. In this example, the user device may be a user device used for scanning objects (e.g., bar codes), and the user device is depicted as being left on a shelf (e.g., at a warehouse, a retail store location, an office, a residential area, and/or the like) sometime after it was used to scan an object.

As shown by reference number 210, the user device may transmit, and the server device may receive, event-based data, such as the event-based data described herein. The user device may be communicatively coupled with the server device via an access point within a physical environment. In this example, the event-based data indicates that a scan was performed by the user device at a particular time (e.g., indicated by the timestamp: 10:15:30 25/10/2022) and associated with a particular location (e.g., indicated by the user device's connection with a particular access point labeled AP 7). While the example only shows a single event, in some implementations, multiple events may be transmitted to the server device.

In some implementations, the user device may be configured to report the event-based data according to a schedule, based on the user device becoming communicatively coupled with an access point, and/or sensor data (e.g., accelerometer data, global positioning satellite (GPS) data, and/or the like) indicating that a particular type of event associated with the user device has occurred, among other examples.

As shown by reference number 220, the server device may determine a status of the user device using a model, such as the model described herein. The model may be configured based on historical event data associated with historical events involving other user devices. For example, as described herein, the model may be generated based at least in part on event-based data received from the other user devices and/or other external devices. In some aspects, historical event data may include data that identifies first values for event parameters that are associated with other user devices that have not been abandoned, and second values for event parameters that are associated with other user devices that have been abandoned. As described in further detail herein, in some implementations, the historical data may be used as training data for a machine learning model.

In some implementations, the server device may obtain the model, used to determine a likelihood of abandonment, from the modeling device described herein. In this example 200, the likelihood of abandonment is identified as 0.85, which may indicate a relatively high (e.g., on a scale of 0 to 1) likelihood that the user device is or will be abandoned. To use the model, the server device may provide at least a portion of the event-based data as input and receive, as output, a value indicating the likelihood of abandonment (e.g., a Boolean true/false value, a percentage likelihood value, and/or the like). The use of the model is described in more detail herein, such as in connection with FIGS. 1 and 3.

In some implementations, the status may indicate whether the user device has been abandoned within a threshold period of time from a user using the user device within the physical environment. For example, that status may indicate that the user device has been abandoned after it has been outside of a predefined physical space for a threshold period of time. In some implementations, the status indicates a probability that the user device has been abandoned that satisfies a probability threshold associated with the user device being abandoned by a user. For example, in a situation where the model is associated with one or more thresholds, a threshold may be used that, when satisfied, indicates the user device is abandoned.

As shown by reference number 230, the server device may determine a location associated with the user device. The determination may be made based at least in part on the status (e.g., as determined by the model) indicating that the user device has likely been abandoned. In some implementations, the location may be based on the event-based data. For example, in example implementation 200, the last known location of the user device may be associated with the access point labeled AP 7. In an area served by multiple access points, the access point with which the user device was last in communication may be used to determine a general location (e.g., near access point AP 7) of the user device. In some implementations, more detailed location data may be recorded. For example, the object that was scanned by the user device may be associated with a particular location, which can be used for the location associated with the scanning event. As another example, wireless signal strength values associated with one or more wireless access points may be used to indicate a position of the user device (e.g., via triangulation using different signal strength values associated with different access points, as provided by the user device and/or the access points).

As shown by reference number 240, the server device may send, and the management device may receive, information identifying the location of the user device. For example, the management device may be associated with a user or other means of recovering the user device (e.g., automated recovery by a drone or other robotic device), and the information identifying the location of the user device may facilitate the management device in recovering the user device. As one example, the management device may be another user device, which may or may not be notified based on proximity of the management device to the user device location. In this situation, the management device may be associated with a user, which may be capable of searching for and recovering the user device based on its last known location. As another example, the management device may be in communication with one or more other user devices, and the management device may be able to send an alert to at least one of the other user devices, to instruct a user associated with the other user device(s) to recover the user device (e.g., based on the user device location). In this situation, the management device may select another device based on proximity to the user device location and provide the other device with information indicating that a user of the other device should search for the user device.

As shown by reference number 250, the server device may provide, and the user device may receive, a user device alert. The user device alert may cause the user device to take some action designed to facilitate recovering the user device. For example, the user device alert may cause the user device to emit a sound, vibrate, flash a light, and/or the like.

In this way, in a situation where a user device is likely to be abandoned, various actions may be taken to facilitate recovery of the user device, including alerts transmitted directly to the user device and other instructions transmitted to other devices that may be capable of facilitating recovery of the user device. As a result, user devices may be less likely to be abandoned, may be more likely to be recovered, and may be more likely to be recovered faster than traditional recovery methods. By reducing user device abandonment, negative impacts may be reduced for users and organizations that make use of user devices, which may include reducing resources that might otherwise be lost recovering and/or replacing abandoned user devices, improving productivity of both users and user devices due to user devices being available for use as opposed to being abandoned, and/or the like.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
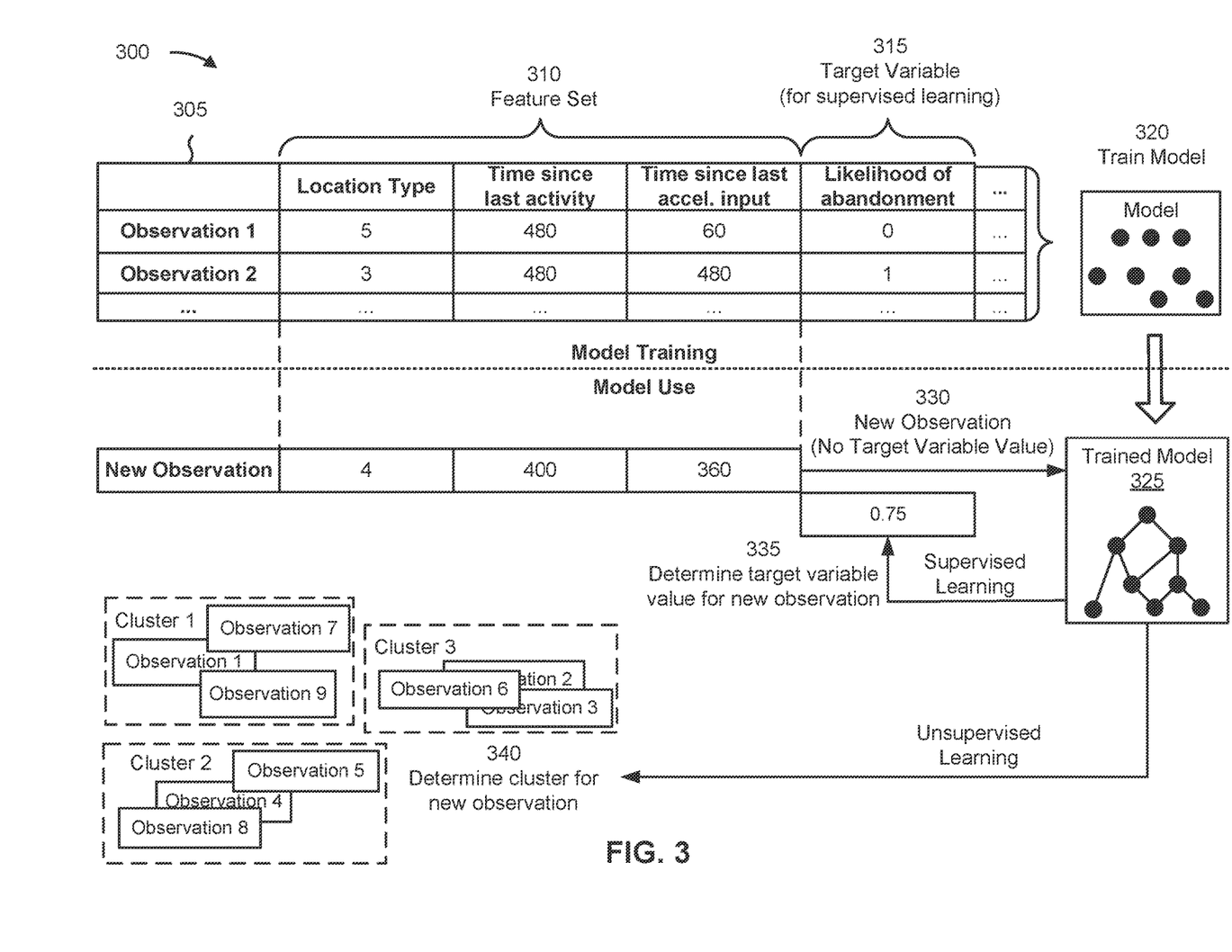
FIG. 3 is a diagram of an example of training and using a machine learning model in connection with detecting abandonment of a user device, as described herein.

FIG. 3 is a diagram illustrating an example 300 of training and using a machine learning model in connection with detecting abandonment of a user device. The machine learning model training and usage described herein may be performed using a machine learning system. The machine learning system may include or may be included in a computing device, a server, a cloud computing environment, or the like, such as a modeling device, a server device, and/or a management device, described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from one or more user devices and/or external devices, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more user devices and/or external devices. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a location type (e.g., where each location type may be associated with a different risk of abandonment based on prior observations), a second feature of a time since the last activity (e.g., the last time the user device was used to scan an object or perform some other activity), a third feature of a time since the last input from an accelerometer (e.g., the last time the user device was moved in a way that triggered accelerometer output), and so on. As shown, for a first observation, the first feature may have a value of 5 (e.g., indicating a relatively high risk based on a scale of 1 to 5, where 1 is low risk and 5 is high risk), the second feature may have a value of 480 (e.g., indicating 480 minutes since the last time the user device was used for an activity, such as being used to scan an object), the third feature may have a value of 60 (e.g., indicating 60 minutes since the last time the user device reported accelerometer input), and so on. These features and feature values are provided as examples and may differ in other examples. For example, the feature set may include features associated with the event-based data described herein, such as one or more of the following features: a time since a last activity (e.g., a specified activity or any activity), a time since a last scan associated with the user device, a time since a last accelerometer input was detected by the user device, a time since an application associated with the user device was access and/or used, a time since the user device was last charging, a time since a battery associated with the user device was last changed, a time since a last transaction associated with the user device, a time since a last communication with an access point, a time since the user device was last detected by another device (e.g., a camera, RFID scanner, smart storage device, geo-fencing device, and/or the like), and/or a time since the user device was last checked in or checked out, among other examples. While the foregoing features are listed as a time since a last event, other features may include measurements other than time associated with the same events, such as a location feature associated with any of the foregoing events (e.g., a location at which an event last occurred may have a value corresponding to a risk value); an absolute time feature (e.g., time of day, week, month, year, and/or the like) associated with any of the foregoing events; a count feature associated with a number of occurrences of any of the foregoing events, and/or the like. Other features may include features associated with a type of user device, a location associated with the user device (e.g., separate from a location of any particular event), a user of the user device (e.g., a user associated with the device and/or a last event associated with the device, may have a value corresponding to a risk value), and/or the like.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a likelihood of abandonment, which has a value of 0.3 for the first observation (e.g., indicating a measure of confidence, between 0 and 1, that the observations indicate a corresponding user device is abandoned).

The feature set and target variable described above are provided as examples, and other examples may differ from what is described above. For example, for a target variable indicating a likelihood of loss (as opposed to intentional deprivation), the feature set may include a time since a last communication between the user device and an access point, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As an example, the machine learning system may obtain training data for the set of observations based on event-based data received from user devices and external devices. For example, over time, event-based data from a variety of devices may be received and stored to be used as training data. In some implementations, the training data may be further based on user input. For example, user input may indicate which observations (e.g., event-based data and/or corresponding user devices) were associated with an actual instance of abandonment. As shown by reference number 315, the target variable may be updated based on actual instances of abandonment or non-abandonment (e.g., a 1 may indicate the observation is associated with a user device being abandoned, while a 0 may indicate the observation is associated with a user device not being abandoned).

As shown by reference number 330, the machine learning system may apply the trained machine learning model 325 to a new observation, such as by receiving a new observation and inputting the new observation to the trained machine learning model 325. As shown, the new observation may include a first feature of a location type, a second feature of a time since a last activity, a third feature of a time since a last accelerometer input, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of 0.75 for the target variable of likelihood of abandonment for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to recover a user device associated with the new observation, a recommendation to send an alert to the user device or another device, and/or the like. The first automated action may include, for example, transmitting a notification to a management device, or another device, to enable recovery of the user device associated with the new observation, transmitting an alert to the user device to cause the user device to take an action to facilitate discovery, such as playing a sound, vibrating, activating lights, and/or the like.

As another example, if the machine learning system were to predict a value of 0.3 for the target variable of likelihood of abandonment, then the machine learning system may provide a second (e.g., different) recommendation (e.g., to flag the corresponding user device as potentially abandoned, but not yet in need of recovery) and/or may perform or cause performance of a second (e.g., different) automated action (e.g., alerting another device, such as another user device, in a location near the user device that corresponds to the new observation).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., observations that are associated with user devices that are likely to be abandoned), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., observations that are associated with user devices at risk of being abandoned), then the machine learning system may provide a second (e.g., different) recommendation (e.g., recommendation to notify nearby devices of the user device associated with the new observation) and/or may perform or cause performance of a second (e.g., different) automated action, such as sending an alert to the user device.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include values manually provided to indicate whether a user device associated with an observation was actually abandoned.

In this way, the machine learning system may apply a rigorous and automated process to detect whether a user device is likely to be abandoned. The machine learning system enables recognition and/or identification of tens, hundreds, thousands, or millions of features and/or feature values for tens, hundreds, thousands, or millions of observations, thereby increasing accuracy and consistency and reducing delay associated with detecting whether a user device is likely to be abandoned relative to requiring computing resources to be allocated for tens, hundreds, or thousands of operators to manually detect whether a user device is likely to be abandoned using the features or feature values.

As indicated above, FIG. 3 is provided as an example. Other examples may differ from what is described in connection with FIG. 3.

Figure 4:
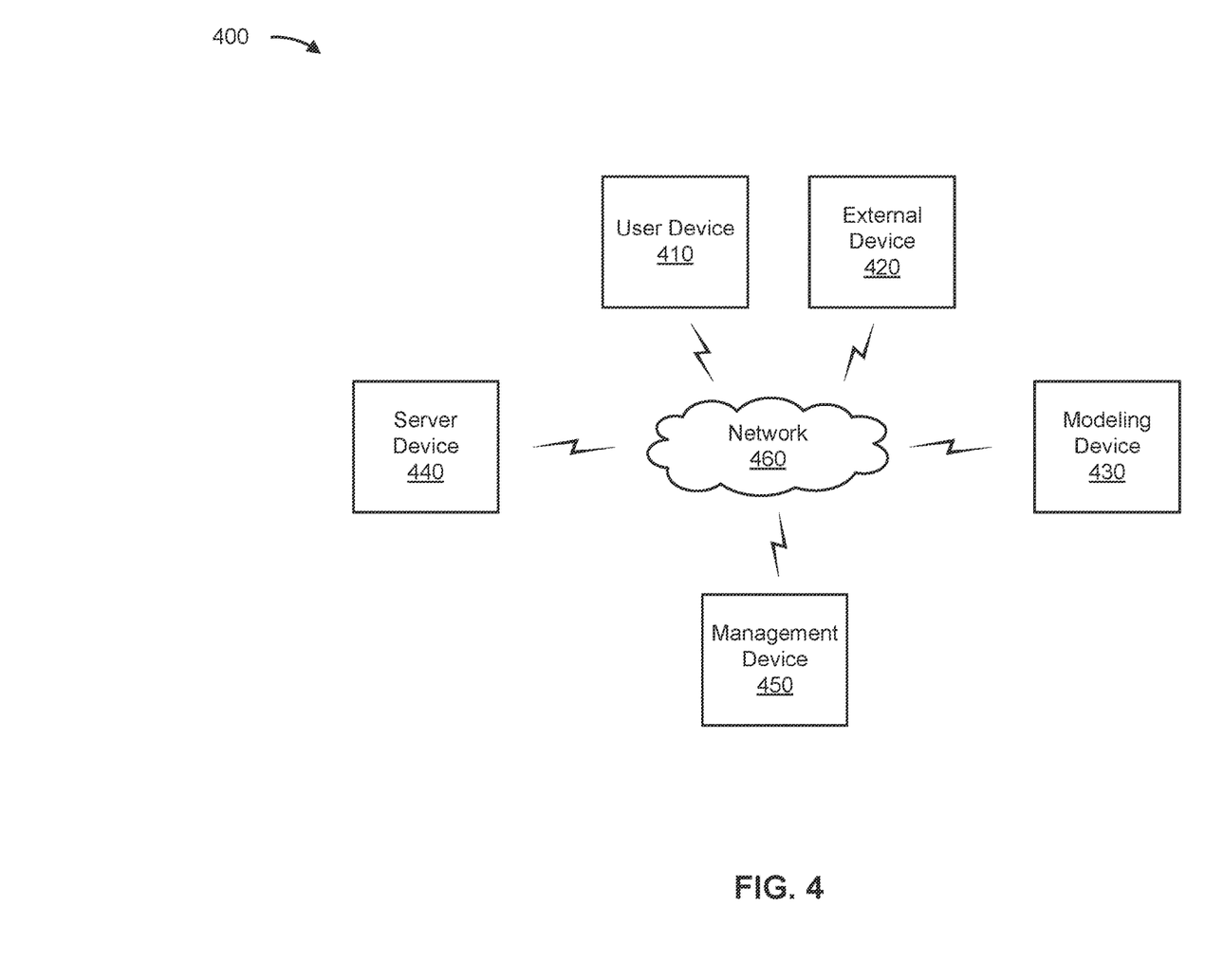
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a user device 410, an external device 420, a modeling device 430, a server device 440, a management device 450, and a network 460. Devices of environment 400 may interconnect via wired connections, wireless connections, or a combination of wired and wireless connections.

The user device 410 includes one or more devices capable of receiving, generating, storing, processing, and/or providing information associated with detecting the status of a user device and, for example, to detect when a user device may be abandoned or otherwise lost, as described elsewhere herein. The user device 410 may include a communication device and/or a computing device. For example, the user device 410 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), handheld scanning device, or a similar type of device.

The external device 420 includes one or more devices capable of receiving, generating, storing, processing, providing, and/or routing information associated with the status of a user device, such as providing event-based data to facilitate determining a likelihood of abandonment associated with a user device, as described elsewhere herein. The external device 420 may include a communication device and/or a computing device. For example, the external device 420 may include a server, such as an application server, a client server, a web server, a database server, a host server, a proxy server, a virtual server (e.g., executing on computing hardware), or a server in a cloud computing system. In some implementations, the external device 420 includes computing hardware used in a cloud computing environment.

The modeling device 430 includes one or more devices capable of receiving, generating, storing, processing, providing, and/or routing information associated with a model for determining the status of a user device, as described elsewhere herein. The modeling device 430 may include a communication device and/or a computing device. For example, the modeling device 430 may include a server, such as an application server, a client server, a web server, a database server, a host server, a proxy server, a virtual server (e.g., executing on computing hardware), or a server in a cloud computing system. In some implementations, the modeling device 430 includes computing hardware used in a cloud computing environment.

The server device 440 includes one or more devices capable of receiving, generating, storing, processing, providing, and/or routing information associated with detecting the status of a user device and facilitating recovery of the user device, as described elsewhere herein. The server device 440 may include a communication device and/or a computing device. For example, the server device 440 may include a server, such as an application server, a client server, a web server, a database server, a host server, a proxy server, a virtual server (e.g., executing on computing hardware), or a server in a cloud computing system. In some implementations, the server device 440 includes computing hardware used in a cloud computing environment.

The management device 450 includes one or more devices capable of receiving, generating, storing, processing, providing, and/or routing information associated with facilitating the recovery of an a user device that is likely to be abandoned, as described elsewhere herein. The management device 450 may include a communication device and/or a computing device. For example, the management device 450 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), handheld scanning device, or a similar type of device; a server, such as an application server, a client server, a web server, a database server, a host server, a proxy server, a virtual server (e.g., executing on computing hardware), or a server in a cloud computing system. In some implementations, the management device 450 includes computing hardware used in a cloud computing environment.

The network 460 includes one or more wired and/or wireless networks. For example, the network 460 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 460 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
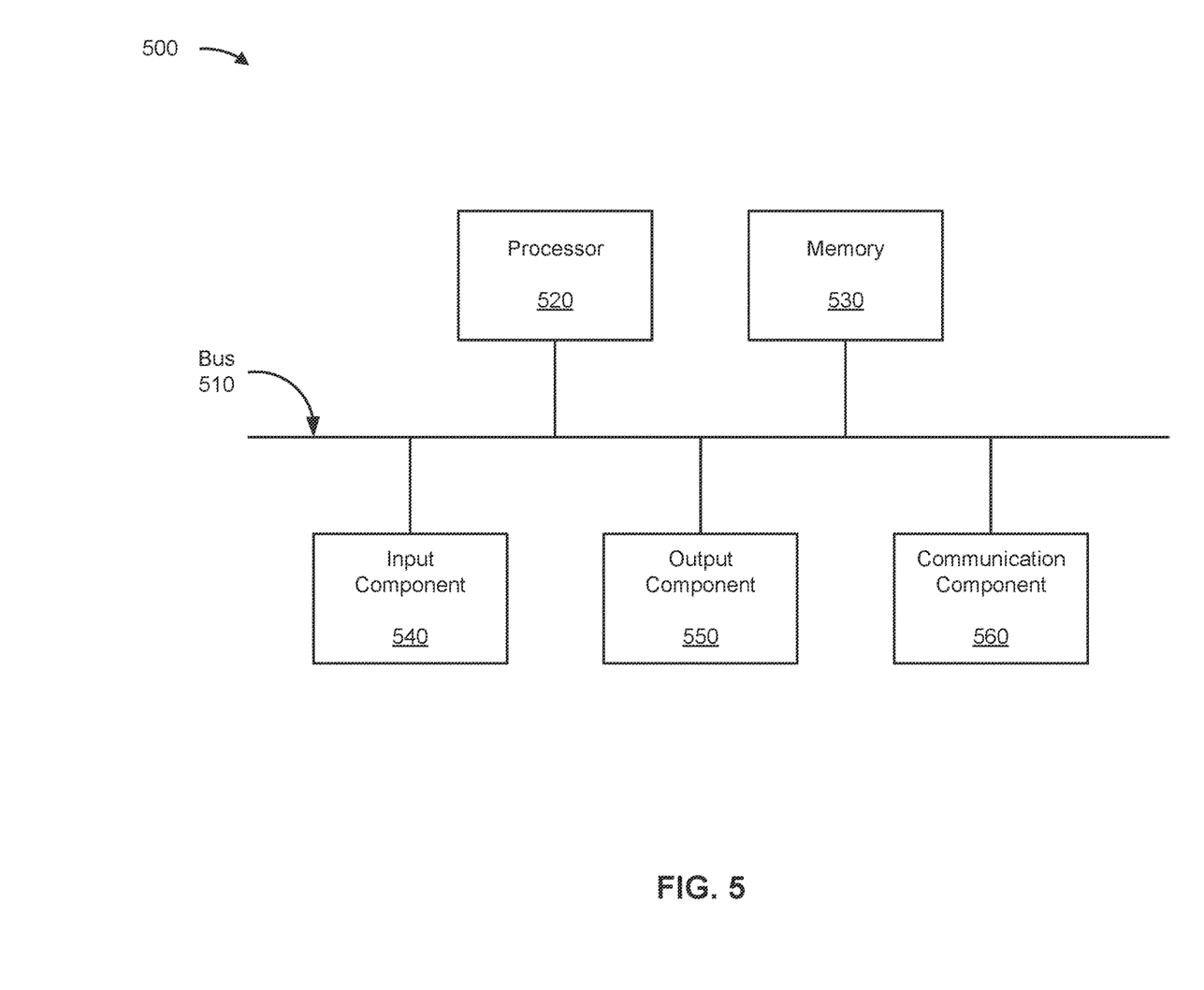
FIG. 5 is a diagram of example components of one or more devices of FIG. 4.

FIG. 5 is a diagram of example components of a device 500, which may correspond to user device 410, external device 420, modeling device 430, server device 440, and/or management device 450. In some implementations, user device 410, external device 420, modeling device 430, server device 440, and/or management device 450 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
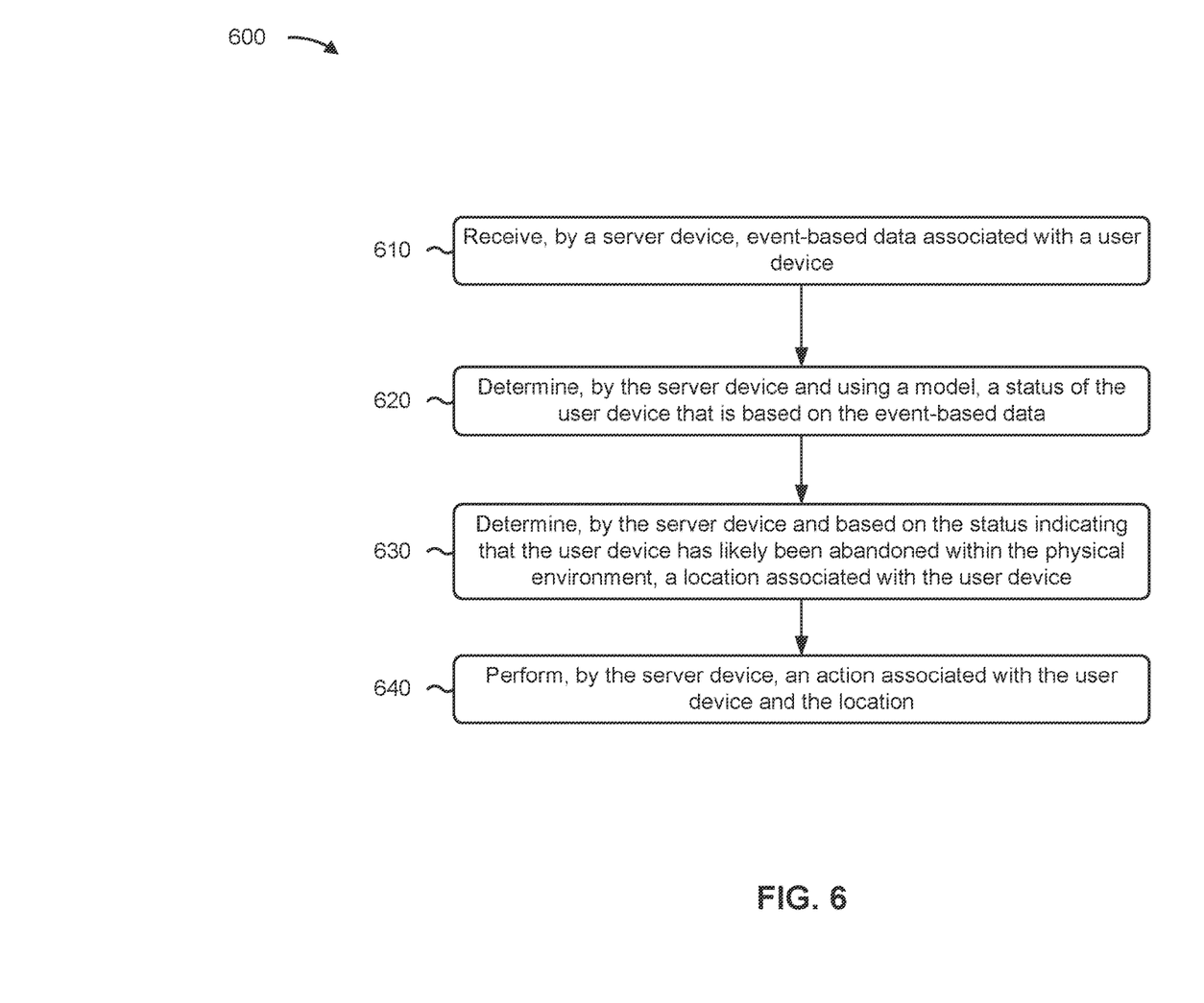
FIG. 6 is a flowchart of an example processes relating to detecting abandonment of a user device, as described herein.

FIG. 6 is a flowchart of an example process 600 associated with system for detection of abandonment of a user device. In some implementations, one or more process blocks of FIG. 6 may be performed by a server device (e.g., server device 440). In some implementations, one or more process blocks of FIG. 6 may be performed by another device or a group of devices separate from or including the server device, such as server device (e.g., server device 440), external device (e.g., external device 420), modeling device (e.g., modeling device 430), and/or management device (e.g., management device 450). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving event-based data associated with a user device, wherein the user device is communicatively coupled with the server device via an access point within a physical environment (block 610). For example, the server device may receive event-based data associated with a user device, wherein the user device is communicatively coupled with the server device via an access point within a physical environment, as described above. In some implementations, the user device is communicatively coupled with the server device via an access point within a physical environment. The event-based data may be received from the user device based on the user device being configured to report the event-based data according to at least one of a schedule, the user device becoming communicatively coupled with the access point, or sensor data associated with a sensor of the user device indicating that a particular type of event associated with the user device has occurred.

As further shown in FIG. 6, process 600 may include determining, using a model, a status of the user device that is based on the event-based data, wherein the model is configured based on historical event data associated with historical events involving a plurality of other user devices that are associated with the user device (block 620). For example, the server device may determine, using a model, a status of the user device that is based on the event-based data, wherein the model is configured based on historical event data associated with historical events involving a plurality of other user devices that are associated with the user device, as described above. In some implementations, the model is configured based on historical event data associated with historical events involving multiple other user devices that are associated with the user device. The status may be indicative of whether the user device has been abandoned within a threshold period of time from a user using the user device within the physical environment. The status may also indicate a probability that the user device has been abandoned, where the probability satisfies a probability threshold associated with the user device being abandoned by a user. In some implementations, process 600 may include generating the model. For example, the server device, or another device, may generate, train, and/or re-train the model, as described herein.

In some implementations, the historical event data includes first historical event data that identifies first values for event parameters that are associated with user devices that have not been abandoned, and second historical event data that identifies second values for the event parameters that are associated with user devices that have been abandoned. The event parameters may include: a user interaction metric associated with other user devices, an application metric associated with an application installed on the other user devices, location information that identifies locations of the other user devices during the historical events, a power consumption metric associated with batteries of the other user devices, and/or a replacement interval associated with replacing the batteries of the other user devices.

As further shown in FIG. 6, process 600 may include determining, based on the status indicating that the user device has likely been abandoned within the physical environment, a location associated with the user device (block 630). For example, the server device may determine, based on the status indicating that the user device has likely been abandoned within the physical environment, a location associated with the user device, as described above.

As further shown in FIG. 6, process 600 may include performing an action associated with the user device and the location (block 640). For example, the server device may perform an action associated with the user device and the location, as described above. In some implementations, performing the action comprises at least one of causing the user device to activate an alert via a speaker of the user device, or providing, to a management device, location information that identifies the location of the user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for detecting a status of a user device, comprising:
   receiving, by a server device, event-based data associated with the user device, the user device being communicatively coupled with the server device via an access point within a physical environment;
   training a machine learning model based on historical event data associated with historical events involving a plurality of other user devices that are associated with the user device;
   determining, by the server device and by utilizing the trained machine learning model, a status of the user device based on the event-based data;
   determining, by the server device and based on the status indicating that the user device has likely been abandoned within the physical environment, a location associated with the user device; and
   performing, by the server device, an action associated with the user device and the location.

2. The method of claim 1, wherein the event-based data is received from the user device based on the user device being configured to report the event-based data according to at least one of:
   a schedule,
   the user device becoming communicatively coupled with the access point, or
   sensor data associated with a sensor of the user device indicating that a particular type of event associated with the user device has occurred.

3. The method of claim 1, wherein the status is indicative of whether the user device has been abandoned within a threshold period of time from a user using the user device within the physical environment.

4. The method of claim 1, wherein the status indicates a probability that the user device has been abandoned that satisfies a probability threshold associated with the user device being abandoned by a user.

5. The method of claim 1, wherein the historical event data includes:
   first historical event data that identifies first values for event parameters that are associated with a first set of the plurality of other user devices not being abandoned, and second historical event data that identifies second values for the event parameters that are associated with a second set of the plurality of other user devices being abandoned.

6. The method of claim 5, wherein the event parameters include at least one of:
    a user interaction metric associated with the plurality of other user devices,
    an application metric associated with an application installed on the plurality of other user devices,
    location information that identifies locations of the plurality of other user devices during the historical events,
    a power consumption metric associated with batteries of the plurality of other user devices, or
    a replacement interval associated with replacing the batteries of the plurality of other user devices.

7. The method of claim 1, wherein performing the action comprises at least one of:
    causing the user device to activate an alert via a speaker of the user device; or
    providing, to a management device, location information that identifies the location of the user device.

8. A system for detecting a status of a user device, comprising:
    one or more memories; and
    one or more processors, coupled to the one or more memories, configured to:
        receive, via an access point, event-based data associated with the user device, the user device being communicatively coupled with the access point within a physical environment associated with an entity;
        train a machine learning model based on historical event data associated with historical events involving historical uses of a plurality of other user devices that are associated with the entity;
        determine, utilizing the trained machine learning model and based on one or more event parameters associated with the event-based data, a status of the user device,
        one or more event parameters being associated with one or more events involving the user device;
        determine, based on the status, that the user device has likely been abandoned within the physical environment; and
        perform an action associated with locating the user device.

9. The system of claim 8, wherein the event-based data is received from the user device based on the user device being configured to report the event-based data when communicatively coupled with the access point.

10. The system of claim 8, wherein the status indicates at least one of:
    whether the user device is likely in-use by a user or has likely been abandoned by a user, or
    a location of the user device.

11. The system of claim 8, wherein the machine learning model is trained based on the historical event data indicating that the historical events involved users of the plurality of other user devices abandoning the plurality of other user devices after respective historical uses of the plurality of other user devices.

12. The system of claim 8, wherein the one or more events are associated with at least one of:
    a user interaction with the user device,
    an application installed on the user device performing an application operation,
    a type of movement of the user device,
    non-movement of the user device for a threshold period of time,
    a charging operation involving a battery of the user device, or
    a replacement of the battery on the user device.

13. The system of claim 8, wherein the one or more processors, to perform the action, are configured to:
    cause the user device to activate an audible alert, or
    provide, to a management device, an indication that the user device has likely been abandoned.

14. The system of claim 8, wherein the one or more processors, to perform the action, are configured to:
    determine a location of the user device within the physical environment; and
    provide, to a management device, location information that identifies the location of the user device.

15. A tangible machine-readable medium storing a set of instructions for detecting a status of a user device, the set of instructions comprising:
    one or more instructions that, when executed by one or more processors of a system, cause the system to:
        receive event-based data associated with the user device in a physical environment, the user device being communicatively coupled with an access point within the physical environment, and the event-based data being received from the user device via the access point;
        train a machine learning model based on historical event data associated with historical events involving a plurality of other user devices that are associated with the user device;
        monitor, utilizing the trained machine learning model, a status of the user device that is based on one or more events identified in the event-based data,
        the status being indicative of whether the user device has been abandoned; and
        provide, to a management device, an indication of the status to permit the management device to monitor the user device for abandonment.

16. The tangible machine-readable medium of claim 15, wherein the event-based data is received from the user device based on the user device being configured to report the event-based data based on a sensor of the user device indicating that a particular type of event associated with the user device being abandoned likely occurred.

17. The tangible machine-readable medium of claim 15, wherein the event-based data indicates at least one of:
    whether the user device has been used by a user within a threshold period of time,
    whether a battery of the user device is being charged, or
    a location of the user device.

18. The tangible machine-readable medium of claim 15, wherein the historical event data includes:
    first historical event data that identifies first values for event parameters that are associated with a first set of the plurality of other user devices that were not abandoned in association with first corresponding historical events of the historical events, and
    second historical event data that identifies second values for the event parameters that are associated with a second set of the plurality of other user devices that were abandoned in association with second corresponding historical events of the historical events.

19. The tangible machine-readable medium of claim 15, wherein the user device and the plurality of other user devices are associated with a same entity.

20. The tangible machine-readable medium of claim 15, wherein the one or more instructions, when executed by the one or more processors, further cause the system to:
provide, to the user device, the indication of the status to permit the user device to indicate the status via a user interface of the user device.

\* \* \* \* \*